United States Patent
Casagrande

(10) Patent No.: US 6,563,887 B1
(45) Date of Patent: May 13, 2003

(54) DIRECT CONVERSION RECEIVER FOR FREQUENCY-SHIFT KEYING MODULATED SIGNALS

(75) Inventor: Arnaud Casagrande, Lignières (CH)

(73) Assignee: Asulab (CH)

( * ) Notice: Subject to any disclaimer, the term of this patent is extended or adjusted under 35 U.S.C. 154(b) by 0 days.

(21) Appl. No.: 09/466,892

(22) Filed: Dec. 20, 1999

(30) Foreign Application Priority Data

Dec. 23, 1998 (EP) .............................. 98124582

(51) Int. Cl.[7] .......................... H03D 3/24; H04L 27/22
(52) U.S. Cl. ...................................... 375/334; 375/331
(58) Field of Search ................... 375/317–350; 329/300–353

(56) References Cited

U.S. PATENT DOCUMENTS

| | | | |
|---|---|---|---|
| 4,437,068 A | | 3/1984 | Picquendar ............ 329/105 |
| 4,583,239 A | * | 4/1986 | Vance .................. 375/324 |
| 5,249,203 A | * | 9/1993 | Loper .................. 375/344 |
| 5,640,428 A | | 6/1997 | Abe et al. ............. 375/334 |
| 5,828,705 A | * | 10/1998 | Kroeger et al. ......... 375/326 |
| 6,075,409 A | * | 6/2000 | Khlat .................. 329/304 |
| 6,304,751 B1 | * | 10/2001 | King ................... 455/306 |
| 6,427,068 B1 | * | 7/2002 | Suominen .............. 455/302 |

FOREIGN PATENT DOCUMENTS

| | | |
|---|---|---|
| EP | 0 305 125 | 3/1989 |
| EP | 0 405 676 A2 | 1/1991 |

* cited by examiner

*Primary Examiner*—Stephen Chin
*Assistant Examiner*—Lawrence Williams
(74) *Attorney, Agent, or Firm*—Griffin & Szipl, P.C.

(57) ABSTRACT

The present invention concerns a receiver (110) including: an antenna (2) able to receive a frequency shift keying modulated signal (S), conversion means (3) able to receive this signal and to provide two first analog signals (I, Q); and demodulation means (112) able to receive said first signals and to provide a signal ($X3^2+Y3^2$) representative of the modulated signal. This receiver is characterised in that the demodulation means comprise: a complex filter (116) able to receive the first analog signals and to provide two second analog signals (X3, Y3), so that the gain of the transfer function (H3) can be equal to two different values (G1, G2); two normalisation means (118, 120) able to receive the second signals, and to provide in response two third analog signals ($X3^2$, $Y3^2$), representing a standard of the second signals; and an adder (122) able to receive said third signals and to provide the sum thereof.

7 Claims, 9 Drawing Sheets

DIRECT CONVERSION RECEIVER FOR FREQUENCY-SHIFT KEYING MODULATED SIGNALS

The present invention concerns the technical field of receivers able to demodulate electric signals and, more precisely, direct conversion receivers for frequency-shift keying (FSK) modulated signals.

With reference to FIG. 1 of the present description, European Patent No. 0,405,676 discloses a receiver 1 including an antenna 2, direct conversion means 3, two limiting amplifiers 28 and 30, demodulation means 5 and a bistable memory 6 connected in series.

Antenna 2 receives a frequency-shift modulated signal S and supplies this signal. In the present description, it will be recalled that FSK modulation is a modulation allowing the supply of a signal at a frequency equal to a value fp+Δf1 to transmit one of the two states of the signal, and at another value fp−Δf1 to transmit the other state, the references fp and Δf1 respectively designating a nominal carrier frequency and a frequency shift. For a data rate equal to 512 bits/s, the frequencies fp and Δf1 have the respective values 400 MHz and 4.5 kHz.

Conversion means 3 includes two mixers 12 and 14, a local oscillator 16, a 90° phase shifter and two low-pass filters 20 and 22. Oscillator 16 provides a frequency fL which is ideally equal to carrier frequency fp. Mixer 12 (14 respectively) includes a first input terminal for receiving signal S, a second input terminal for receiving frequency fL, and an output terminal connected to filter 20 (22 respectively). Moreover, mixer 14 is connected to oscillator 16 via phase shifter 18. As a result of this arrangement, if the frequency of signal S equals fp+Δf1, the frequencies provided by mixers 12 and 14 respectively equal +Δf1 and +Δf1−π/2 and, if the frequency of signal S equals fp−Δf1, the frequencies provided by mixers 12 and 14 respectively equal −Δf1 and −Δf1−π/2. Filter 20 (22 respectively) can receive the frequency provided by mixer 12 (14 respectively) and, in response, provide a signal I (respectively a signal Q). It will be recalled that signals I and Q represent the real and imaginary parts of a complex signal having a negative frequency (in this case −Δf1) or a positive frequency (in this case +Δf1). FIG. 2 of the present description shows two timing charts 24 and 26 illustrating signals I and Q, respectively. As FIG. 2 shows, signals I and Q are analog signals having substantially sinusoidal wave shapes in phase quadrature. The presence of a phase change of signal Q will be noted, as illustrated by timing chart 26.

With reference once more to FIG. 1, limiting amplifiers 28 and 30 can receive signals I and Q and, in response, provide signals I1 and Q1 respectively. It will be recalled that a limiting amplifier receives an input signal, and provides an output signal whose amplitude does not increase in practice beyond a determined amplitude of the input signal. FIG. 3A of the present description shows two timing charts 32 and 34 illustrating signals I1 and Q1 respectively. As FIG. 3A shows, signals I1 and Q1 are digital signals having wave shapes which are offset with respect to each other and rectangular, the amplitudes of signals I1 and Q1 equalling −1 or +1.

FIG. 3B shows a curve 80 illustrating the relationship between the instantaneous values I1(t) and Q1(t) of signals I1 and Q1 at an instant t. As FIG. 3B shows, curve 80 has a rectangular shape wherein the peaks are formed by four points A to D. It will be noted that a temporal evolution of these signals translates into a path along this curve, so that, when signal Vout equals 0 (1 respectively), signals I1 and Q1 are represented in succession by points A, B, C, D, A . . . (respectively A, D, C, B, A . . . ), i.e. a path along the trigonometric direction (respectively the opposite direction to the trigonometric direction).

With reference once again to FIG. 1, demodulation means 5 include a differentiator circuit 40 (42 respectively), a multiplier 36 (38 respectively) and a subtractor 39 connected in series.

Multiplier 36 (38 respectively) includes a first input terminal for receiving signal Q1 (I1 respectively) and a second input terminal for receiving signal I1 (Q1 respectively), via differentiator circuit 40 (42 respectively). Multiplier 36 (38 respectively) is arranged for providing signal X1 (Y1 respectively). FIG. 4 of the present description shows two timing charts 44 and 46 illustrating signals X1 and Y1 respectively. As FIG. 4 shows, signal X1 contains first pulses, and signal Y1 contains second pulses offset with respect to the first pulses. Subtractor 39 includes a first input terminal for receiving signal X1 and a second input terminal for receiving signal Y1. Subtractor 39 is arranged to provide a signal X1-Y1 equal to the difference between signals X1 and Y1. FIG. 5 of the present description shows a timing chart 48 illustrating signal X1-Y1. As FIG. 5 shows, signal X1-Y1 contains the pulses resulting from the difference between signals X1 and Y1. It will be noted that, prior to the phase change of signal Q, signal X1-Y1 contains negative pulses and that this phase change causes positive pulses to be supplied.

Bistable memory 6 includes an input terminal for receiving signal X1-Y1, and an output terminal for providing a signal Vout in response. FIG. 6 of the present description shows a timing chart 50 illustrating signal Vout. As FIG. 6 shows, signal Vout is equal to a level <<0>> or to a level <<1>>. It will be noted that, as soon as a positive pulse appears on signal X1-Y1, signal Vout switches from level <<0>> to level <<1>>, and remains at this level, independently of the subsequent frequency difference between signals X1 and Y1.

The operation of receiver 1 will now be briefly described with reference to FIGS. 1 to 6 cited above.

Up to an instant t01, signals I1 and Q1 are periodic of period T, signal I1 being in advance of signal Q1, so that signal Vout equals 0. Signals I1 and Q1 are represented in succession by points A, B, C, D, A . . . Thus, at instant t01, signal Q1 becomes equal to 1. At an instant t1 subsequent to instant t01, and prior to instant t01+T/2, a new data item is present in signal Q1, so that the timing of signals I1 and Q1 is reversed after instant t01+T/2 (i.e. signals I1 and Q1 are represented in succession by points B, A, D, C, B . . . ). It will be noted that the switching of signal Vout occurs during the following switching of signal I1 to level "−1", i.e. at an instant t3. In other words, there is a time delay between the instant when the data is contained in signal Q (i.e. instant t1) and the instant when the data is contained in signal Vout (i.e. instant t3). It will also be noted that this time delay is comprised between T/2 and T, which requires a high Δf/D ratio, the reference Δf designating the frequency shift (equal in this case to Df1) and the reference D designating the bit rate. Thus one drawback of receiver 1 is that there is a high Δf/D ratio: one bit is typically provided every four periods.

In order to overcome this drawback, there exist in the state of the art FSK modulated signal receivers which perform demodulation directly from the analog signals I and Q provided by the conversion means.

With reference to FIG. 7 of the present description, U.S. Pat. No. 5,640,428 discloses a receiver 90 including an antenna 2, conversion means 3, demodulation means 92 and a low-pass filter 94. It will be noted that the elements in FIG. 7 which are similar to those described in relation to FIG. 1 have been designated by the same references. As FIG. 7 shows, demodulation means 92 include four mixers 96 to 99, two holding circuits 100 and 101 and three delay circuits 102 to 104. It will be noted that receiver 90 performs demodulation of a signal S received by antenna 2, by analog processing of such signal. However, this processing is achieved by digital processing elements (clock signals, flip-flops) in the same way as receiver 1 of FIG. 1.

Moreover, one drawback of receivers 1 and 90 is that demodulation means 5 and 92 contain multipliers which are components having a complex structure (in particular two input terminals), i.e. components which are difficult to manufacture.

One object of the present invention is to provide an FSK modulated signal receiver which overcomes the aforementioned drawbacks, in particular a receiver of this type which performs instantaneous demodulation on the basis of analog signals.

Another object of the present invention is to provide an FSK modulated signal receiver which performs demodulation of data received with a minimum Δf/D ratio (typically less than 1).

Another object of the present invention is to provide an FSK modulated signal receiver having demodulation means which do not include any multipliers.

Another object of the present invention is to provide an FSK modulated signal receiver which answers the criteria of rationality, compactness and cost, which are conventional in the semiconductor industry.

These objects, in addition to others, are achieved by the receiver according to claim 1.

One advantage of the complex filter of such a receiver is that it can be made by semiconductor components which are simple to manufacture, without forming multipliers or mixers with several inputs, like conventional receivers.

Another advantage of the filter of such a receiver is that it filters half of the noise originating from the modulated signal, which considerably reduces the influence of noise on the receiver output signal.

These objects, features and advantages of the present invention, in addition to others, will appear more clearly upon reading the detailed description of a preferred embodiment of the invention, given solely by way of example, with reference to the annexed drawings, in which:

FIG. 1 which has already been cited, shows a first conventional receiver;

FIGS. 2, 3A and 4 which have already been cited, each shows two timing charts illustrating the electric signals present in the receiver of FIG. 1;

FIG. 3B which has already been cited, shows a curve illustrating the relationship between the two electric signals of FIG. 3A;

FIGS. 5 and 6 which have already been cited each shows a timing chart illustrating an electric signal present in the receiver of FIG. 1;

FIG. 7 which has already been cited, shows a second conventional receiver;

Figure 8:
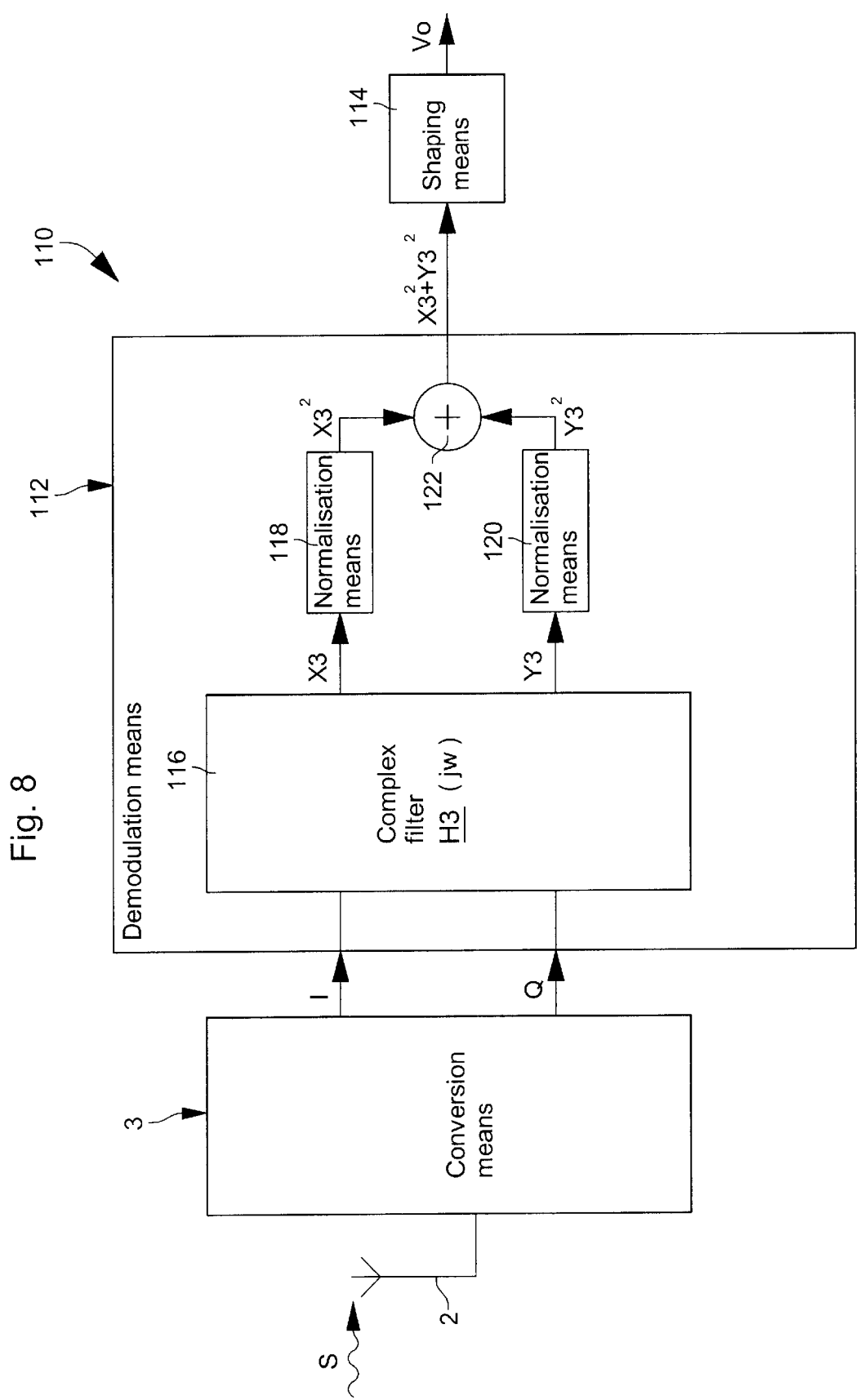
FIG. 8 shows a receiver according to the present invention.

FIG. 8 shows a receiver 110 according to the present invention including an antenna 2, conversion means 3, demodulation means 112 and shaping means 114. As FIG. 8 shows, demodulation means 112 include a complex filter 116, two normalisation means 118 and 120 and an adder 122.

Figure 1:
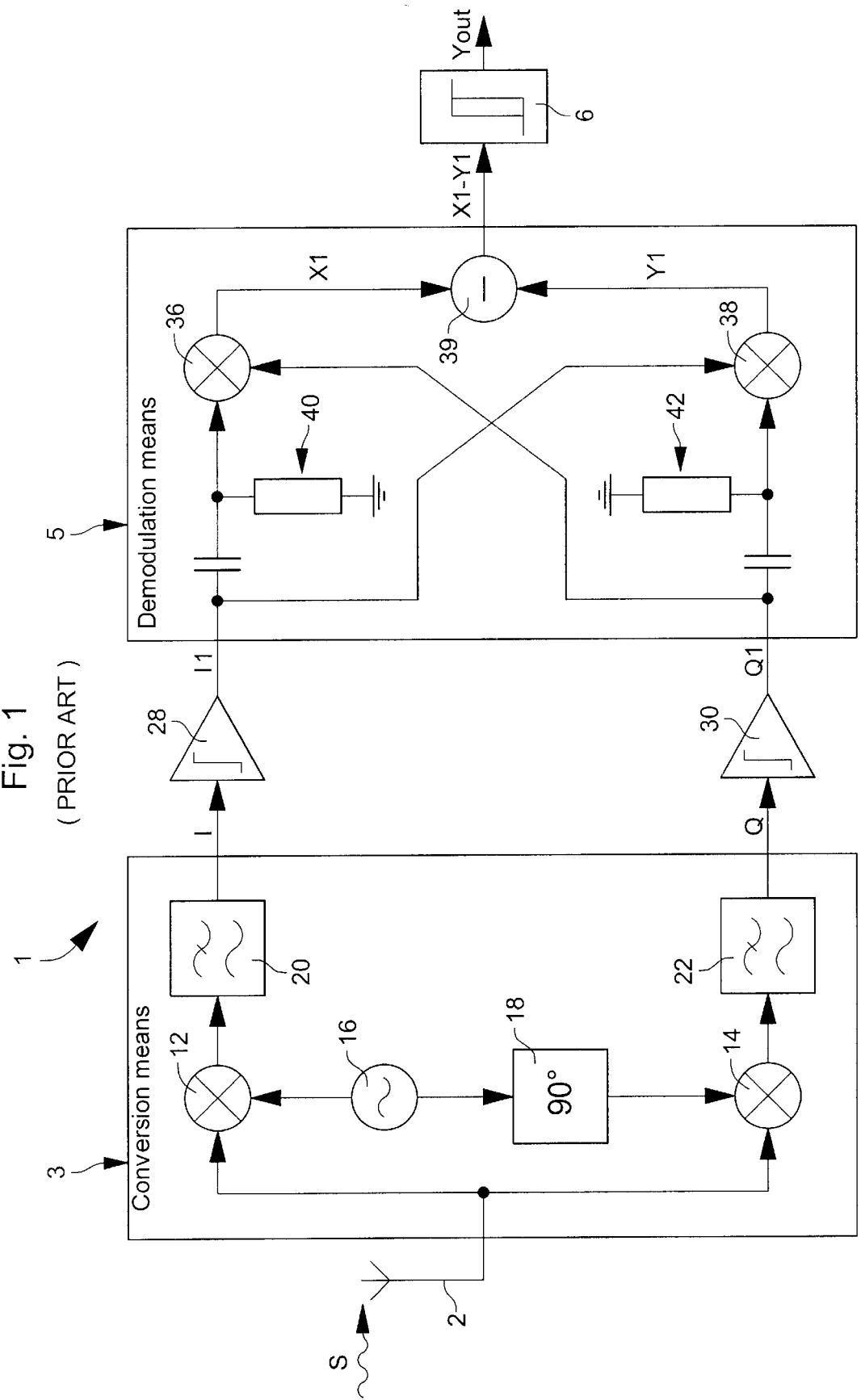

It will be noted that the elements of FIG. 8 which are similar to those described in relation to FIG. 1 have been designated by the same references. However, filters 20 and 23 of conversion means 3 as described in relation to FIG. 1 are not necessary for making receiver 110, the function of these filters being assured by complex filter 116.

Figure 9:
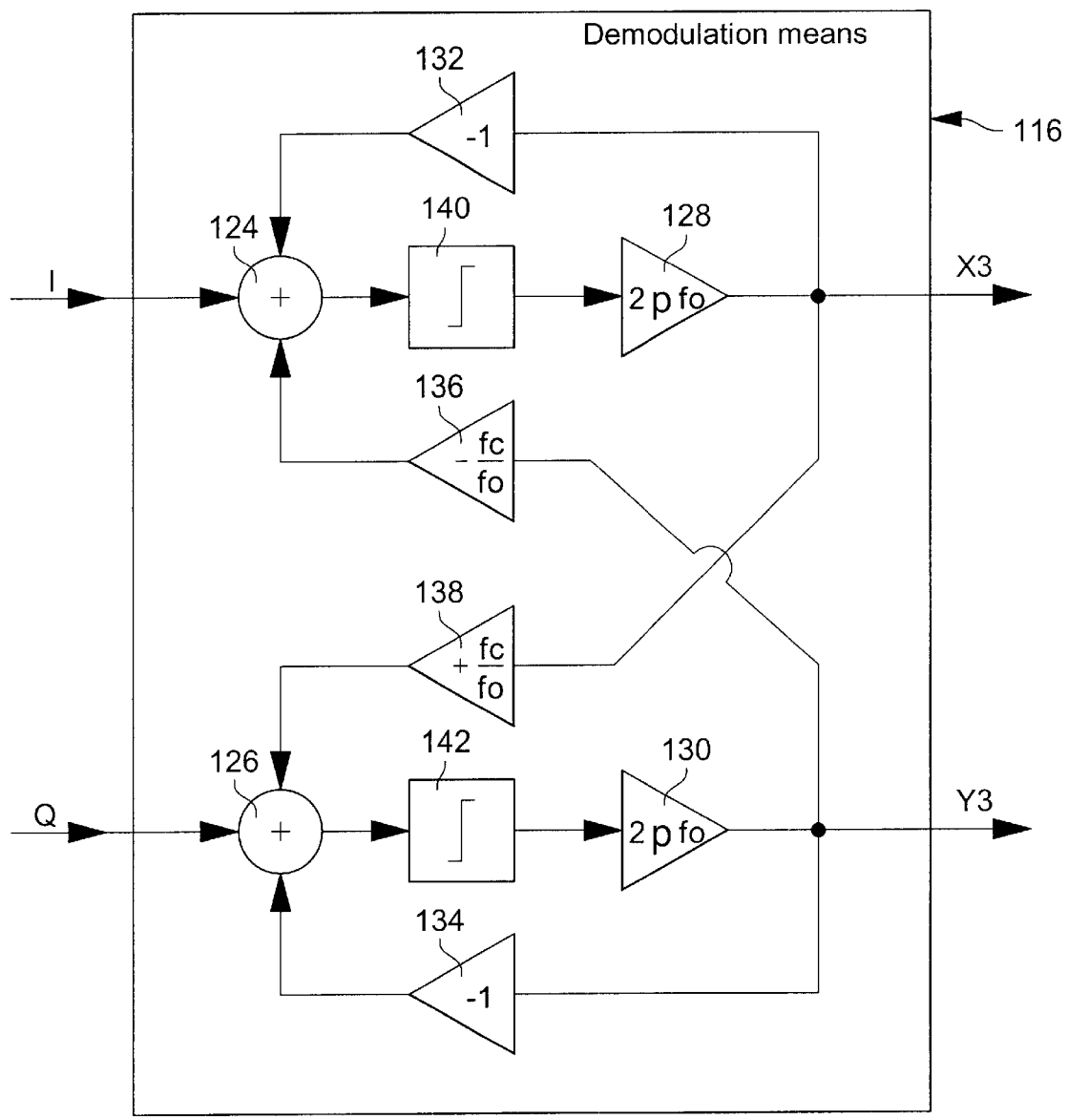
FIG. 9 shows an embodiment of a filter of the receiver of FIG. 8.

Complex filter 116 is arranged to receive the analog signals I and Q provided by conversion means 3, as was already described in more detail with reference to FIG. 1. Complex filter 116 is also arranged to provide two analog signals X3 and Y3 so that signals I, Q, X3 and Y3 are connected by the following relationship:

$$X3+jY3=H3(jf)\cdot(I+jQ)$$

where the reference f designates the frequency and the reference H3(jf) designates the transfer function associated with complex filter 116. Complex filter 116 is also arranged so that the values of the gain IH3(jf)I for the transfer function H3(jf) are different for the different frequency shifts. In the present case, since these frequency shifts are −Δf1 and +Δf1, one has: IH3(−jΔf1)I≠IH3(+jΔf1)I. FIG. 9 shows an embodiment of complex filter 116 including two adders 124 and 126, six amplifiers 128, 130, 132, 134, 136 and 138, and two integrators 140 and 142. It will be noted that the gains of amplifiers 128 and 130 equal fo, that those of amplifiers 132 and 134 equal −1 and that those of amplifiers 136 and 138 equal −fc/fo.

Adder 124, integrator 140 and amplifier 128 are connected in series, and arranged so that adder 124 receives analog signal I and amplifier 128 provides signal X3. Adder 124 also receives signal X3 via amplifier 132. Likewise, adder 126, integrator 142 and amplifier 130 are connected in series and arranged so that adder 126 receives analog signal Q and amplifier 130 provides signal Y3. Adder 126 also receives signal Y3 via amplifier 134. Moreover adder 124 also receives signal Y3 via amplifier and adder 126 also receives signal X3 via amplifier 138.

Figure 2:
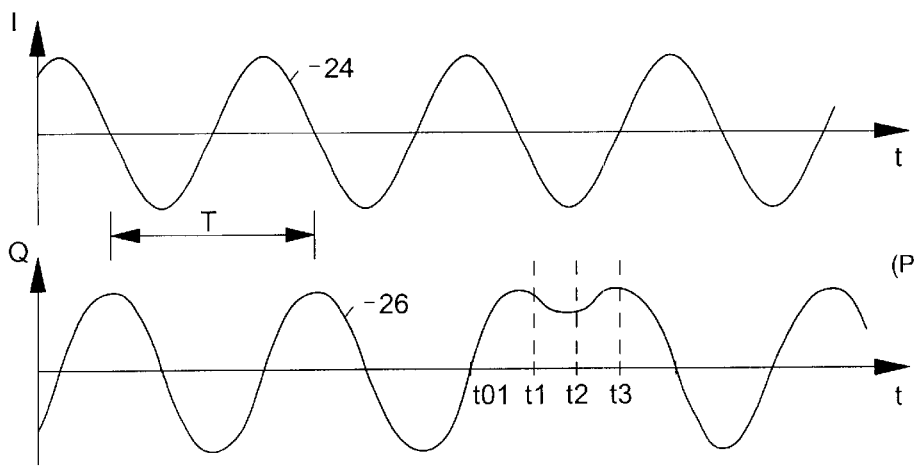
Figure 3A:
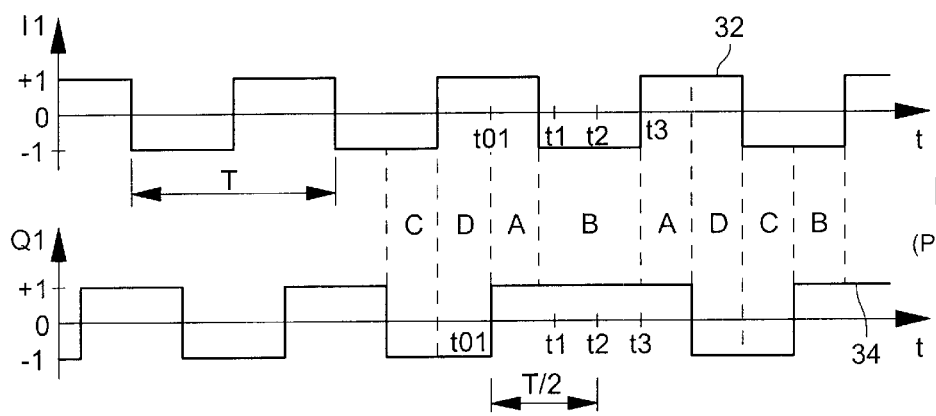
Figure 4:
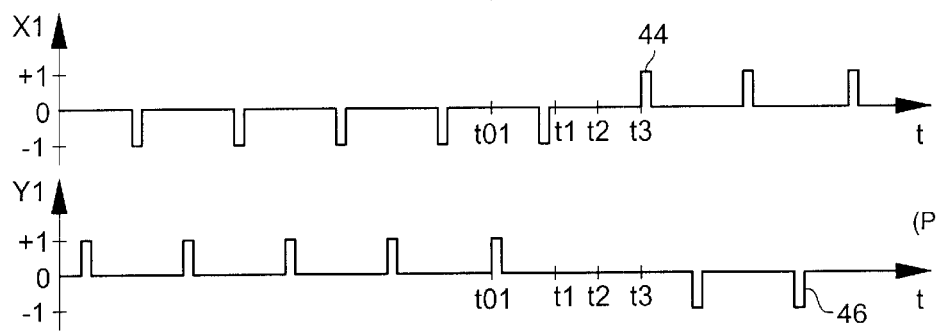
Figure 5:
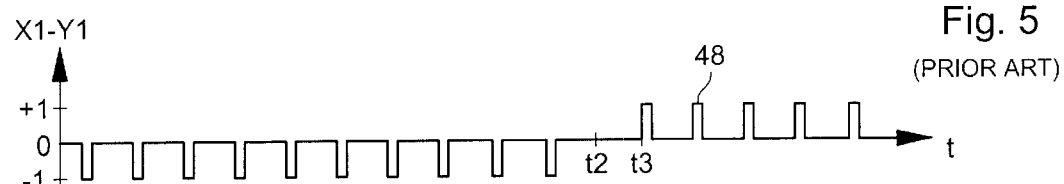
Figure 6:
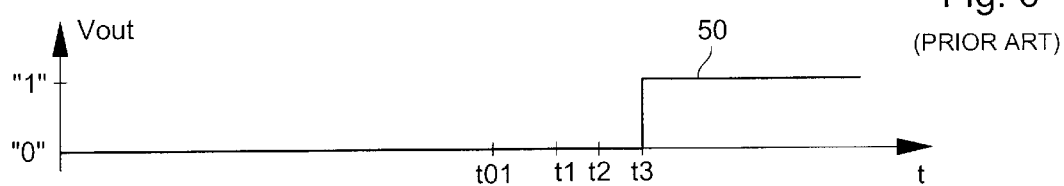
Figure 3B:
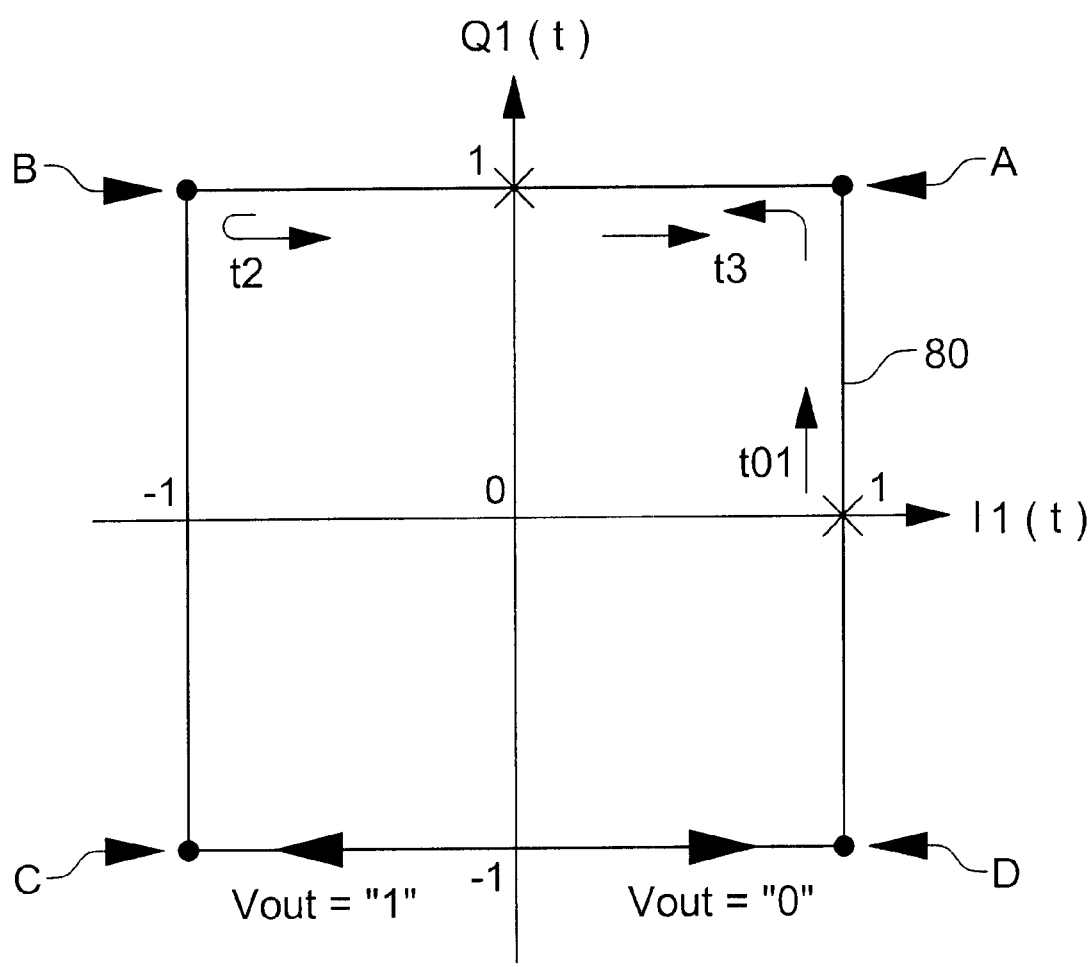
Figure 7:
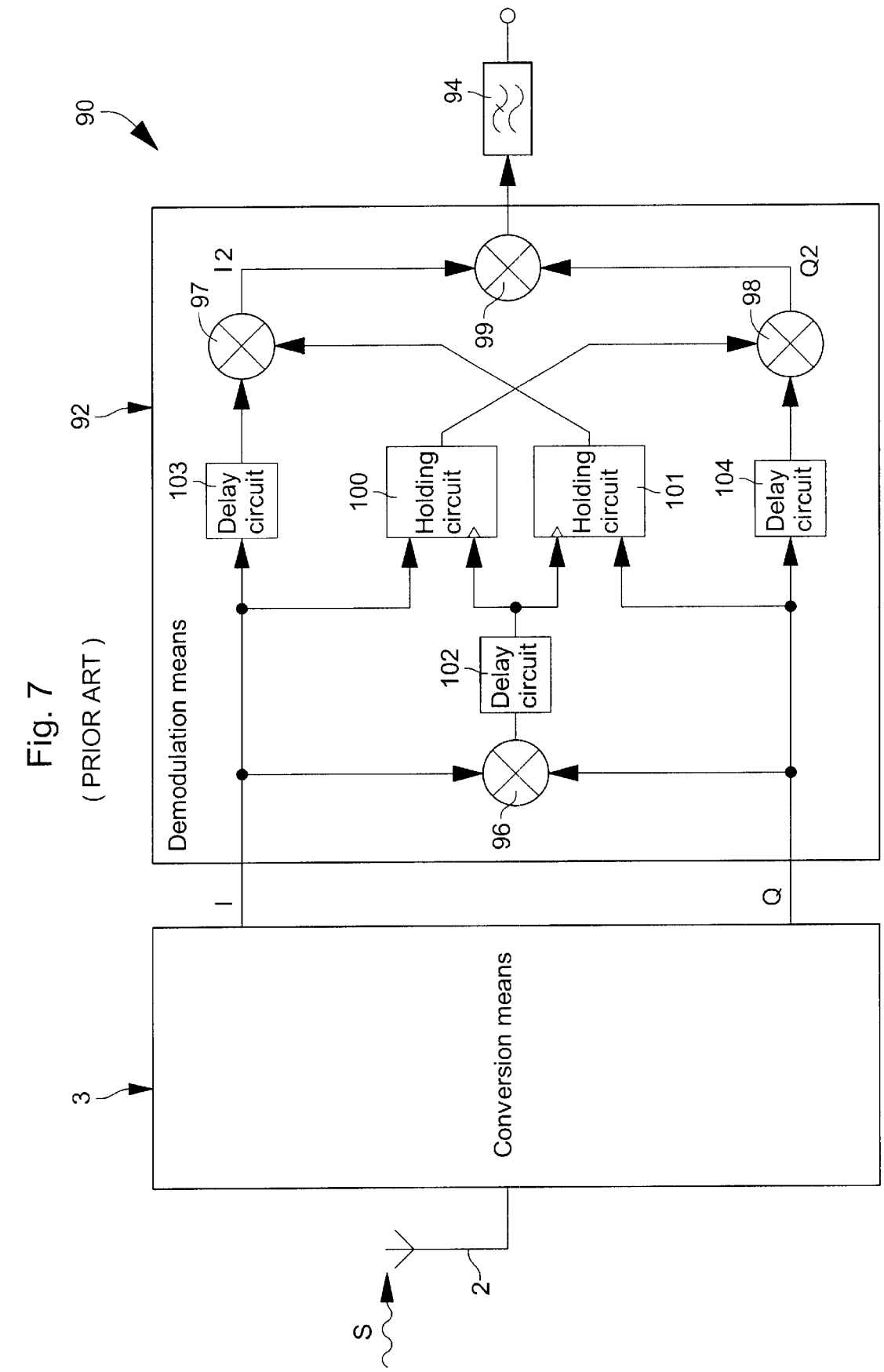

As FIG. 2 shows, conversion means 3 and demodulation means 112 are preferably made by forming components (which can be made via CMOS type technology), so that the amplitudes of signals X3 and Y3 are equal. By way of improvement, receiver 110 can include two variable gain amplifiers (known in the art) connected so that conversion means 3 provides signal I (signal Q respectively) to demodulation means 112, via one of these amplifiers (or other amplifiers respectively).

Figure 10:
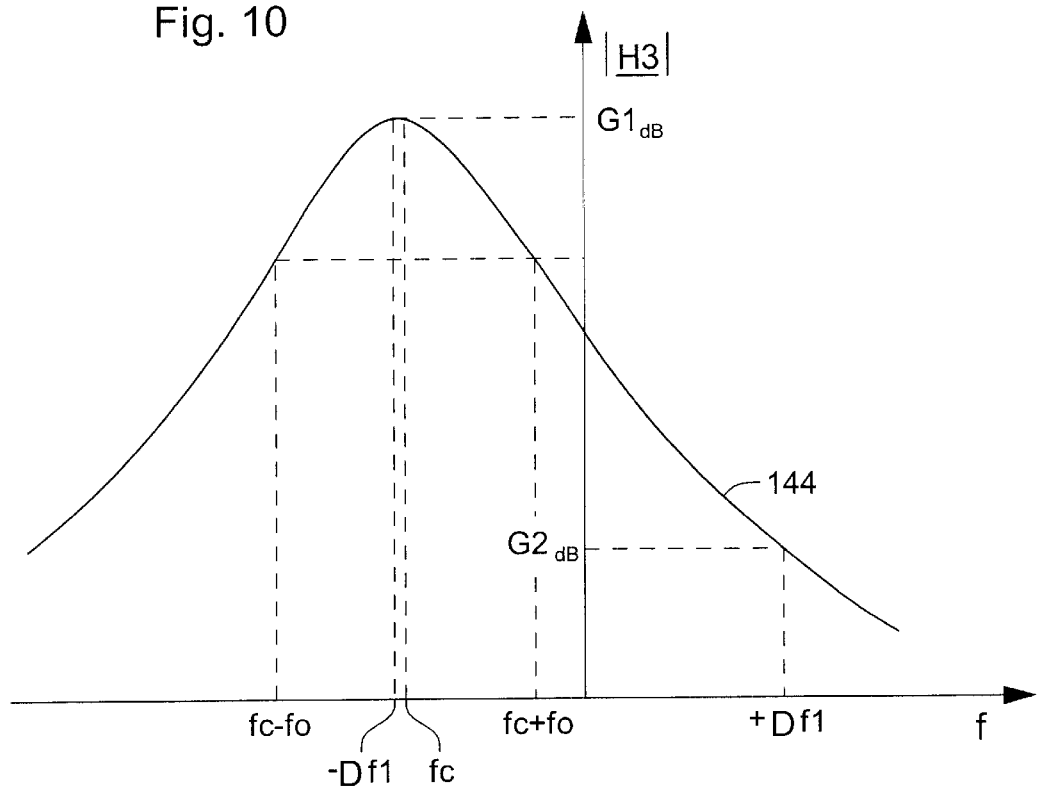
FIG. 10 shows a curve illustrating the gain of the filter of FIG. 9, in relation to a modulation having two frequency shifts.

FIG. 10 shows a curve 144 illustrating the gain |H3(jf)| relating to filter 161 as shown in FIG. 9. It will be noted in FIG. 10 that the gain |H3(jf)| is shown according to a logarithmic scale, and that frequency f is shown according to a linear scale. Curve 144 is centred on frequency fc, so that transfer function H3(jf) is asymmetrical. Those skilled in the art will note that filter 116 can be considered like a low-pass filter whose cut-off frequencies equal fc−fo and fc+fo. It will be noted that as a result of the asymmetry of this transfer function, gain |H3(jf)| equals +G1 when frequency f equals -Δf1, that gain |H3(jf)| equals +G2 when frequency f equals +Δf1, and that +G1≠+G2. It will also be noted that the noise from modulated signal S, which corresponds to the positive frequencies is filtered, which considerably increases the noise influence on signals X3 and Y3 provided by filter 116.

Figure 11:
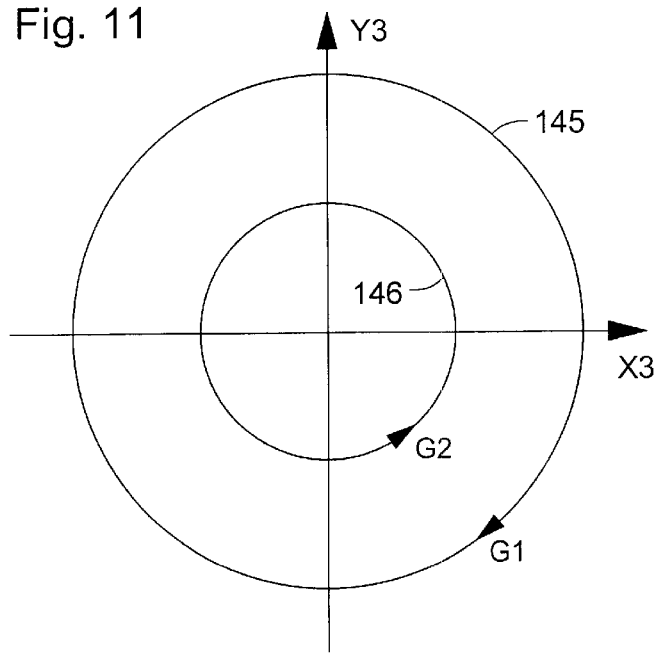
FIG. 11 shows a curve illustrating the relationship between the two electric signals provided by the filter of FIG. 9, in relation to a modulation having two frequency shifts.

FIG. 11 illustrates the relationship between instantaneous values X3(t) and Y3(t) of signals X3 and Y3 at an instant t. As FIG. 11 shows, over time t, instantaneous values X3(t) and Y3(t) draw a first circle 145 and a second circle 146. It will be noted that, in the event that the maximum amplitudes (respectively minimum amplitudes) of signals I and Q equal 1 (respectively -1), the radius of circle 146 equals +G2 and the radius of circle 145 equals +G1. It will be noted that a temporal evolution of these signals translates into a path along these circles, so that, when signals X3 and Y3 draw circle 146 (respectively circle 145) along the trigonometric direction (respectively along the opposite direction to the trigonometric direction), signal Vout equals 0 (1 respectively).

With reference again to FIG. 8, normalisation means 118 are arranged to receive analog signal X3 and, in response, to provide a signal representing a standard of signal X3. Preferably, normalisation means 118 are made by semiconductor components (which can be made by CMOS type technology) so that this standard corresponds to the square function. Thus, by way of illustration only, in the following description, the reference $X3^2$ designated the signal representing this standard of signal $X3^2$.

Likewise, normalisation means 120 are arranged to receive analog signal Y3 and in response, to provide a signal representing the same standard of signal Y3. Preferably normalisation means 120 are made by semiconductor component so that this standard corresponds to the square function. Thus by way of illustration only, in the following description the reference $⅓^2$ designates the signal representing this standard of signal Y3.

Adder 122 is arranged to receive signals $X3^2$ and $Y3^2$ and, in response, to provide a signal $X3^2+Y3^2$ representing the sum of signals $X3^2$ and $Y3^2$. It will be noted that signal $X3^2+Y3^2$ is an analog signal.

With reference once again to FIG. 8, shaping means 114 is arranged to receive analog signal $X3^2+Y3^2$ and, in response, to provide a digital signal Vo equal to a level <<0>> (a level <<1>> respectively), when signal $X3^2+Y3^2$ is less (greater respectively) than a predetermined threshold. Shaping means 114 are preferably made by forming a threshold comparator, this threshold corresponding to the predetermined threshold and being selected to be comprised between the values $+G1^2$ and $+G2^2$.

Figure 12:
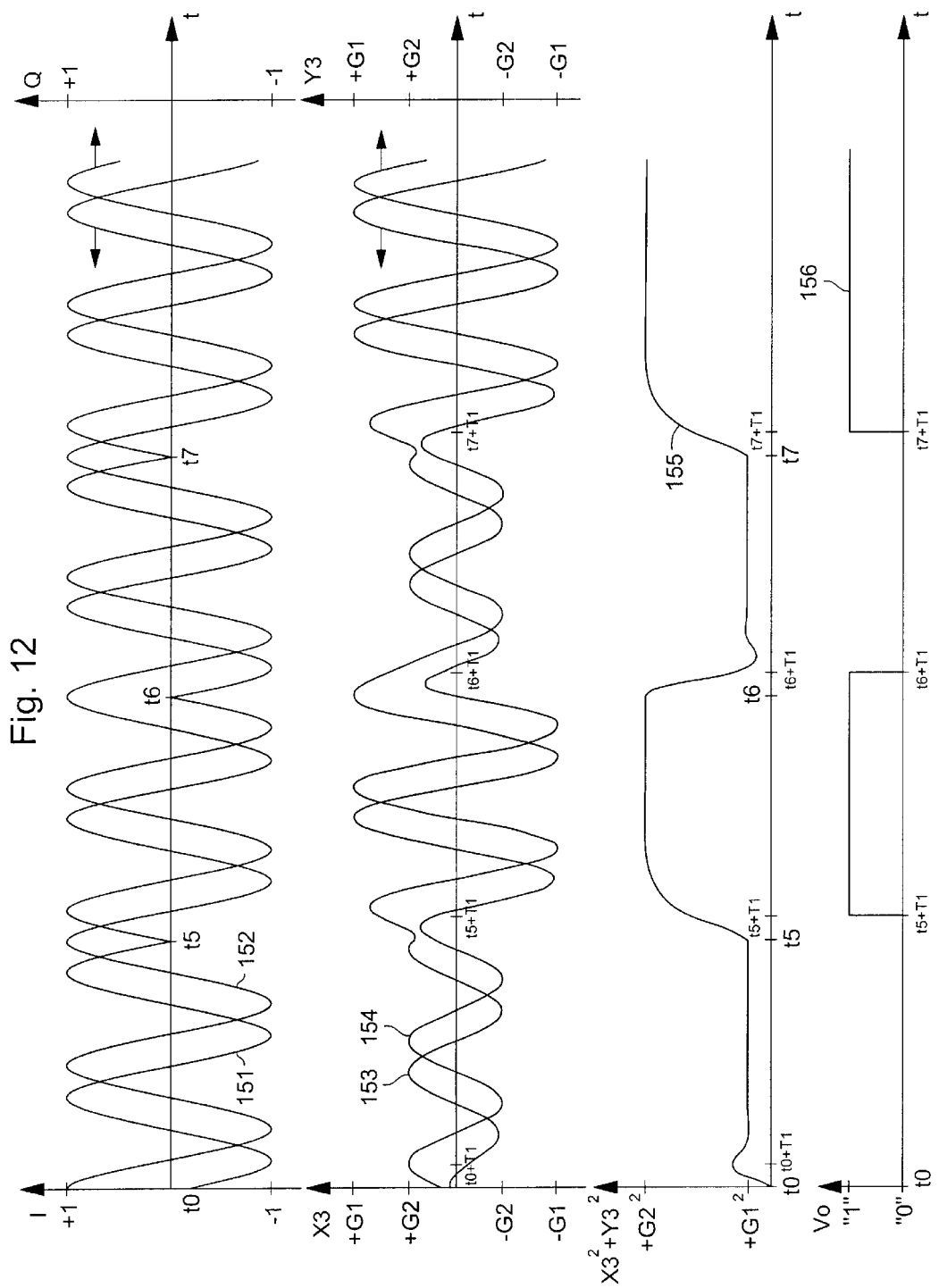
FIG. 12 shows ten timing charts illustrating electric signals present in the receiver of FIG. 8.

The operation of receiver 110 will now be briefly described with reference to FIG. 12 which shows six timing charts 151 to 156.

Let us assume that at an initial instant t0 antenna 2 receives a signal at frequency fp+Δf1. As a result conversion means 3 provides signals I and Q so that these signals have sinusoidal wave shapes of period T (corresponding to frequency +Δf1) and in phase quadrature, signal Q being in advance of signal I. By way of example, let us assume that the maximum and minimum amplitudes of signals I and Q equal 1. Complex filter 116 receives these signals I and Q and provides in response signals X3 and Y3 so that: X3+jY3=H3(jf)·(I+jQ). Thus, being given that frequency f of signals I and Q equal +Δf1, the gain IH3(jf)I equals +G2, as was already described in relation to FIG. 10. As a result, after instant t0, values X3(t) and Y3(t) of signals X3 and Y3 draw circle 146, i.e. signals X3 and Y3 have sinusoidal wave shapes at frequency +Δf1 and in phase quadrature, signal Y3 being in advance of signal X3. It will be noted that signals X3 and Y3 are proportional to respective signals I and Q, but in time delay of a period T1 with respect thereto, and that they have minimum and maximum amplitudes equal to +G2 and -G2 respectively. Thus, after instant t0, normalisation means 118 and 120 respectively provide signals $X3^2$ and $Y3^2$ to adder 122, and the latter provides in response the signal $X3^2+Y3^2$ equal, in this case, to $+G2^2$. Shaping means 114 provides in response signal Vo equal to the level <<0>>.

Let us consider that at an instant t5 subsequent to instant t0, antenna 2 receives a signal at frequency fp-Δf1, which causes a modification of the wave shape of signal Q provided by conversion means 3. In response, complex filter 116 provides signals X3 and Y3 so that the gain IH3(jf)I equals +G1, given that the frequency f of signals I and Q equals -Δf1. As a result, after instant t5, values X3(t) and Y3(t) of signals X3 and Y3 draw circle 145, i.e. signals X3 and Y3 have sinusoidal wave shapes at frequency -Δf1 and in phase quadrature. It will be noted that signals X3 and Y3 are proportional to signals I and Q, respectively, and have minimum and maximum amplitudes equal to +G1 and -G1. Thus, after instant t5, normalisation means 118 and 120 provide respectively signals $X3^2$ and $Y3^2$ to adder 122, and the latter provides in response signal $X3^2+Y3^2$ equal, in this case, to $+G1^2$. Shaping means 114 provides in response signal Vo equal to the level <<1>>. It will be noted that the transition between levels <<0>> and <<1>> occurs via continuous variations in signals X3 and Y3 at instant t7, as FIG. 11 shows.

Likewise, at an instant t6 subsequent to instant t5, antenna 2 receives a signal at frequency fp+Δf1. The situation is similar to that described for instant t0. As a result, after instant t5, shaping means 114 provides in response signal Vo equal to level <<0>>.

Likewise, at an instant t7 subsequent to instant t6, antenna 2 receives a signal at frequency fp-Δf1. The situation is similar to that described for instant t5. As a result, after instant t7, shaping means 114 provides in response signal Vo equal to level <<1>>.

It will be noted that, at the instant when signals I and Q contain an item of data (-Δf1 or +Δf1) originating from antenna 2, this data item is provided at the same instant to demodulation means 112, unlike conventional receiver 1 in which the data item is only provided to conversion means 5 during the following half-cycle (requiring a time delay equal to T/2, the reference T designating the period of signals I1 and Q1, as was described in relation to FIGS. 1 to 6).

It will be also noted that time delay T1 between the instant at which the data item is provided by conversion means 3 and the instant at which the data item is contained in signal Vo is essentially due to the response time of complex filter 116, i.e. to the response time of integrators 140 and 142 of such filter. This is particularly advantageous, since several data items can thus be received by antenna 2 and provided in the form of signal Vo, during a same half-cycle (for example at instants t6 and t7). Consequently, receiver 110 can operate with a low Δf/D ratio (in this example less than 1), which allows at least four bits to be provided during one period of signal Vo. It will also be noted that one advantage of the transfer function H3(jf) is that it allows demodulation of signals I and Q, from an amplitude relationship connected to gain IH3(jf)I, since: IH3(-j Δf1)I=+G1≠+G2=IH3(+j Δf1) I.

Another advantage of receiver 110 is that it enables demodulation of FSK modulated signals to be achieved with N frequency shifts $\Delta f^1, \Delta f^2 \cdots \Delta f^N$ without any structural modification of the receiver (with the exception of shaping means 114 made, in this case, by a comparator having N−1 thresholds).

Figure 13:
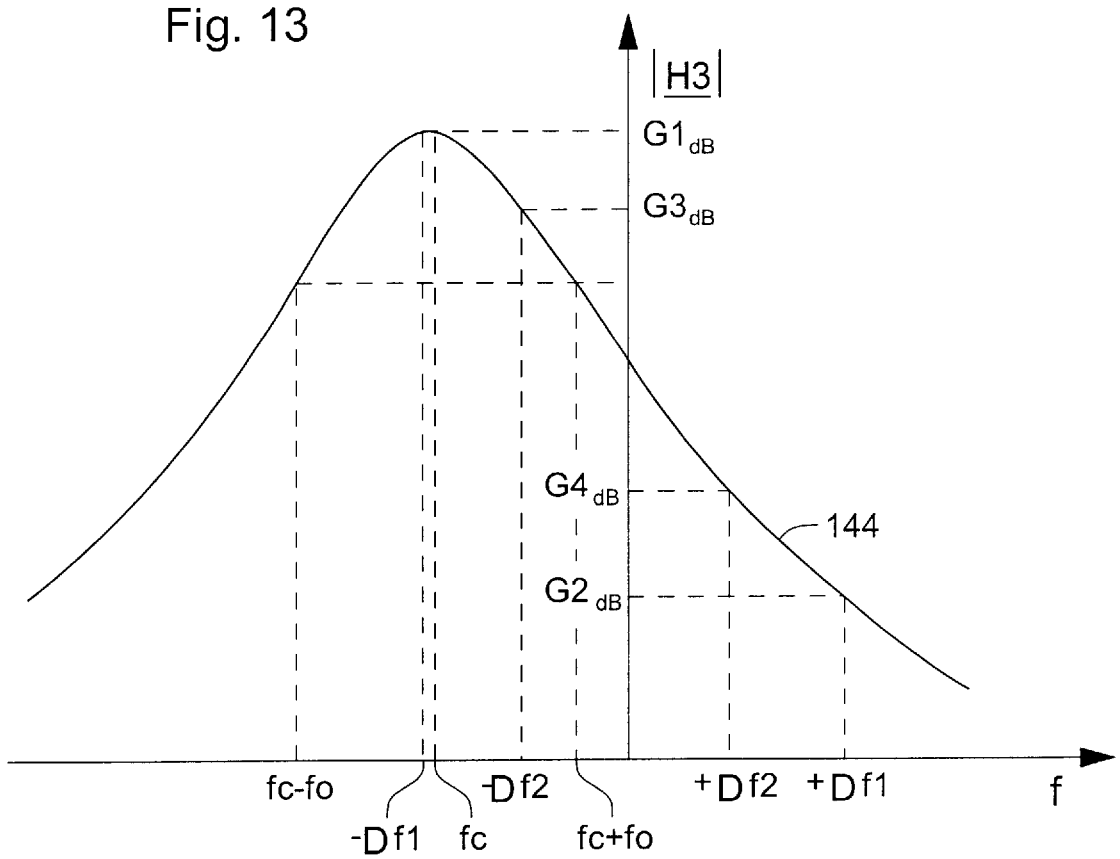
FIG. 13 shows a curve illustrating the gain of the filter of FIG. 9, in relation to a modulation having four frequency shifts.
Figure 14:
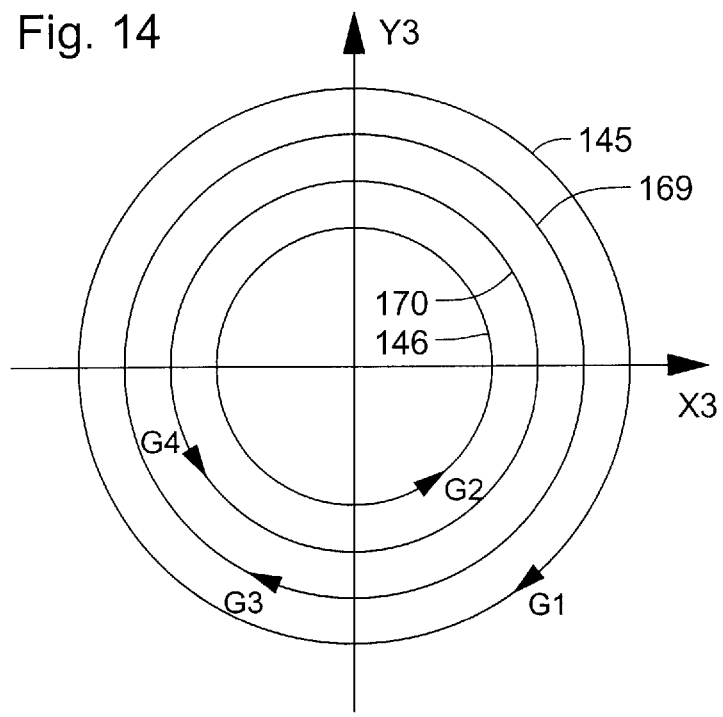
FIG. 14 shows a curve illustrating the relationship between two electric signals provided by the filter of FIG. 9, in relation to a modulation having four frequency shifts.

Let us consider the case in which N=4 and more particularly the case in which $\Delta f^1 = -\Delta f1$, $\Delta f^2 = +\Delta f1$, $\Delta f^3 = -\Delta f2$, $\Delta f^4 = +\Delta f2$. With reference to FIG. 13 which shows the curve of gain IH3(jf)I (i.e. curve 144 of FIG. 10), it is to be noted that gain IH3(jf)I equals G3 when frequency f equals −Δf2, and that gain IH3(f)I equals G4 when frequency f equals +Δf2. FIG. 14 shows the relationship between instantaneous values X3(t) and Y3(t) of signals X3 and Y3 at an instant t, in relation to FIG. 13. Thus, in addition to circles 145 and 146 which have already been described in relation to FIG. 11, values X3(t) and Y3(t) can draw a third circle 169 and a fourth circle 170. It will be noted that in the event that the maximum (respectively minimum) amplitudes of signals I and Q equal 1 (respectively −1), the radius of circle 169 equals G3 and the radius of circle 170 equals G4. It will be noted that a temporal evolution of these signals translates into a path along these circles, so that, when signals X3 and Y3 draw circles 145 and 169 in the opposite direction to the trigonometric direction, signal Vo equals respectively <<0>>, <<1>>, and that when signals X3 and Y3 draw circles 170 and 146 along the trigonometric direction, signal Vo equals respectively <<3>>, <<4>>.

It goes without saying for those skilled in the art that the detailed description hereinbefore can undergo various modifications without departing from the scope of the present invention. By way of example, the normalisation means of the receiver according to the present invention can be arranged to provide as standard the <<absolute value>> function or the <<2 m power>> function, the reference m being an integer number greater than or equal to 2.

What is claimed is:

1. A direct conversion receiver for frequency shift keying modulated signals, said receiver including:
   an antenna able to receive a frequency shift keying modulated signal;
   conversion means able to receive said modulated signal and to provide in response first and second analog signals in phase quadrature, these signals being representative of the real and imaginary parts of a complex signal having at least a first negative frequency or a second positive frequency
   demodulation means able to receive said first and second signals and to provide in response a third signal representative of the data contained in said modulated signal, wherein said demodulation means include:
      a complex filter arranged to receive said first and second signals, and to provide in response fourth and fifth analog signals so that, when the frequency of said first and second signals is equal to said first frequency, respectively to said second frequency, the gain of the transfer function is equal to a first gain value, respectively to a second gain value which is different to said first gain value;
      first and second normalisation means arranged to receive respectively said fourth and fifth signals, and to provide in response a sixth analog signal respectively a seventh analog signal representing a standard of said fourth signal, respectively of said fifth signal; and
      a first adder arranged to receive said sixth and seventh signals and to provide in response said third analog signal representing the sum of said sixth and seventh signals.

2. A receiver according to claim 1, wherein said complex filter includes:
   a second adder, a first integrator and a first amplifier connected in series, said second adder being able to receive said first signal and said first amplifier being able to provide said fourth signal;
   a third adder, a second integrator and a second amplifier connected in series, said third adder being able to receive said second signal and said second amplifier being able to provide fifth signal; and
   third, fourth, fifth and sixth amplifiers, said second adder also receiving said fourth signal via said third amplifier, as well as said fifth signal via said fourth amplifier, and said third adder also receiving said fifth signal via said fifth amplifier, as well as said fourth signal via said sixth amplifier.

3. A receiver according to claim 2, further including first and second variable gain amplifiers connected so that said conversion means provides said modulation means with said first and second signals, via said first and second variable gain amplifiers, respectively.

4. A receiver according to claim 1, wherein said first and second normalisation means are arranged so that said standard corresponds to a <<2 m power>> function, the reference m designating an integer number which is not zero.

5. A receiver according to claim 1, wherein said first and second normalisation means are arranged so that said standard corresponds to the <<absolute value>> function.

6. A receiver according to claim 1, further including shaping means arranged to receive said seventh signal and to provide in response an eighth digital signal, so that this latter is equal to a low level, respectively to a high level, when said seventh signal is less, respectively greater than a predetermined threshold comprised between the standards of said first and second gain values.

7. A receiver according to claim 6, wherein the shaping means is formed by a comparator with N−1 thresholds, the reference N designating an integer number greater than or equal to 2, corresponding to the number of frequency shifts.

* * * * *